United States Patent
Spencer

(10) Patent No.: US 9,552,289 B1
(45) Date of Patent: Jan. 24, 2017

(54) BITWISE ADDRESSING OF ENTRIES IN A FORWARD LOOKUP TABLE

(71) Applicant: Seagate Technology LLC, Cupertino, CA (US)

(72) Inventor: Thomas V. Spencer, Fort Collins, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 124 days.

(21) Appl. No.: 14/553,805

(22) Filed: Nov. 25, 2014

(51) Int. Cl.
*G06F 12/02* (2006.01)

(52) U.S. Cl.
CPC ... *G06F 12/0246* (2013.01); *G06F 2212/7201* (2013.01)

(58) Field of Classification Search
CPC ............ G06F 12/0246; G06F 2212/7201
See application file for complete search history.

(56) References Cited

U.S. PATENT DOCUMENTS

| | | | |
|---|---|---|---|
| 5,493,660 A * | 2/1996 | DeLano | G06F 12/1027 711/206 |
| 7,444,442 B2 | 10/2008 | Dabral et al. | |
| 8,225,047 B2 | 7/2012 | Yano et al. | |
| 2014/0208062 A1 | 7/2014 | Cohen | |

* cited by examiner

*Primary Examiner* — Eric S Cardwell
(74) *Attorney, Agent, or Firm* — Hollingsworth Davis, LLC

(57) ABSTRACT

A logical address is received that references data stored at a physical address of a non-volatile memory. From the logical address, one or more words of a forward table in random access memory are received. The one or more words encompass the physical address. A bit address within the one or more words is also received. The bit address is not aligned with boundaries of the one or more words. The logical address is forward mapped to the physical address utilizing the one or more words and the bit address.

20 Claims, 5 Drawing Sheets

US 9,552,289 B1

BITWISE ADDRESSING OF ENTRIES IN A FORWARD LOOKUP TABLE

SUMMARY

The present disclosure is related to systems and methods that facilitate bitwise addressing of entries in a forward lookup table. In one embodiment, a method, apparatus, and/or computer readable medium facilitates receiving a logical address that references data stored at a physical address of a non-volatile memory. From the logical address, one or more words of a forward table in random access memory are received. The one or more words encompass the physical address. A bit address within the one or more words is also received. The bit address is not aligned with boundaries of the one or more words. The logical address is forward mapped to the physical address utilizing the one or more words and the bit address.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures.

DETAILED DESCRIPTION

Figure 1:
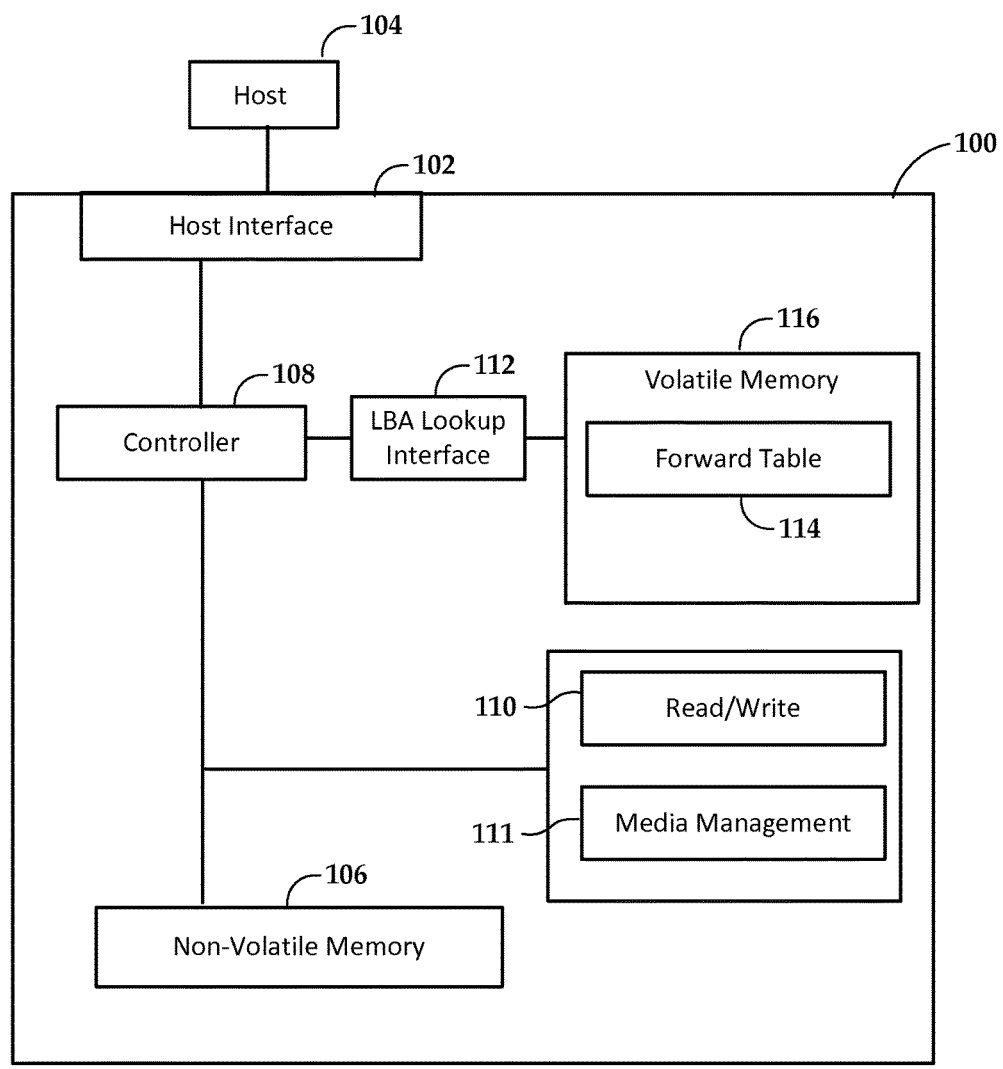
FIG. 1 is a block diagram of a system and apparatus according to an example embodiment.

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

The present disclosure is generally related to persistent data storage devices such as solid-state drives (SSDs). Persistent data storage devices generally utilize a host interface that facilitates communications between a host (e.g., central processing unit) and an embedded processor within the storage device. The communications may utilize a standard such as SATA, SCSI, SaS, PCI, etc. The host uses logical block addresses to access (e.g., read from and write to) the storage device, and the storage device may maintain its own system of physical addresses that are mapped to associated logical addresses.

Devices such as HDDs and SSDs are sometimes referred to as block storage devices. The minimum addressable unit in such devices is referred to as a block or physical record. Blocks are generally larger than word sizes used by the host's central processing unit (CPU), input-output (I/O) busses, and random access memory (RAM). For example, a 64-bit processor may be able to individually address 64-bit (8 byte) words in dynamic random access memory (DRAM), but individual blocks addressed on an HDD may be 512 bytes or more in size. The block size may correspond to the size of individual sectors on the HDD, or to the size of pages of an SSD.

The data storage device internally uses physical addresses to access the data storage medium, e.g., hard disk, flash memory, other type of solid state memory, etc. For a number of reasons, the storage device may want to restrict access to the full range of physical addresses. For example, the storage device may reserve some amount of media for storing state data used by its own embedded system. The storage device may also prevent host access to some physical addresses due to defects in the storage media.

An HDD may use a relatively straightforward mapping between logical and physical addresses. For example, the first logical address 0 may start at a particular sector address N, and the sector address corresponding to a logical address N is N+M. In contrast, an SSD may use a more complicated mapping between logical and physical addresses. For example, SSDs using flash memory cannot rewrite a page without first erasing the page. Because erasure is expensive, e.g., in terms of wear on memory cells, power, latency etc., an existing page is instead modified by writing to an empty (e.g., already erased) page, and then remapping the logical address to the new page. The old page can be marked as invalid and erased later when convenient, in a process known as garbage collection. Also, in a process known as wear leveling, the controller may purposely cause data to be distributed across a range of physical addresses. This can prevent excessive wear of flash media in regions that see higher than normal use.

As a result of this type of remapping, a flash memory SSD may use a forward lookup table to determine which physical address corresponds to a logical address. A forward lookup table may be implemented as a content-addressable memory structure, where the index of the lookup (in this case, the logical address) is used to find a location in memory where the lookup value (in this case, the physical address) is stored.

The forward lookup table in a flash-based SSD may be implemented with an array of DRAM that is contained within the SSD and coupled to an SSD controller. The table is used to map from a Map Unit Address (MUA), which is derived from the logical block address (LBA), to a physical address in the flash array. The forward table entry may contain a few bits of additional information about the target map unit (MU) as well.

The minimum size of the forward table entries is a function of the size of the map unit and the flash capacity of the drive. In current implementations, the MUA is used to index into the table to quickly find the entry that contains the physical flash address for the MU data. Generally, the entry may be wholly contained in one or more words addressable in DRAM, and the MUA-based index includes a starting address for the one or more words. If the entry does not fit fully within the one or more words, there will be some bits wasted.

For some implementations, the size of the forward table entry is less than or equal to 32-bits. Where the entry is less than 32-bits, the number of wasted bits may be at an acceptable level. As the capacity of the drives push to the 16 TB range in the future, the forward table entry will need to grow beyond 32-bits. If the current technique of using full words in DRAM to store forward table entries, then almost half of the DRAM capacity would be wasted. This is compounded by the number of unused bits plus the larger size of the table due to increased number of entries. This could consume many gigabytes of DRAM space which could be unacceptably expensive. While firmware may be modified to compress the data to conserve DRAM space, this may have an unacceptably high impact on performance.

Embodiments described herein may include a hardware-implemented (or firmware-implemented) forward table controller that receives the MUA and returns the forward table (FT) entry. The forward table controller will pack the data in the array so that no bits of DRAM are wasted regardless of the size of the forward table entry. This involves inserting the entries starting at bit addresses that may not be aligned with word boundaries of the random access memory. The entries may span two or more words of the random access memory. The end of the entries may also be at bit addresses that are not aligned with word boundaries of the random access memory. The packing may be performed by an intermediary component, e.g., forward table interface, such that the system controller for the data storage device need not be aware that this packing is occurring.

In FIG. 1, a block diagram illustrates a data storage device 100 according to an example embodiment. The data storage device 100 may be any type of persistent storage device, including a solid-state drive (SSD), thumb drive, memory card, embedded device storage, hybrid drive, etc. The data storage device 100 may include a host interface 102 that facilitates communications between the data storage device and a host 104, e.g., a computer. The data storage device 100 also includes data storage media, here shown as solid-state, non-volatile memory 106. The host 104 can store user data on and read user data from the memory 106 via the host interface 102. One or more controllers 108 internally manage these storage operations.

The controller 108 may include general-purpose or special-purpose processors that perform operations of the apparatus. The controller 108 may include any combination of microprocessors, digital signal processor (DSPs), application specific integrated circuits (ASICs), field programmable gate arrays (FPGAs), or other equivalent integrated or discrete logic circuitry suitable for performing the various functions described herein. Functions that may be provided by the controller 108 include read/write operations, and media management, which are represented here by functional modules 110, 111. The modules 110, 111 may be implemented using any combination of hardware apparatus, software, and firmware, and may separately or cooperatively perform forward table lookups as described herein.

The read/write module 110 manages host requests to read and write data, and this generally involves translating from logical to physical addresses. Similarly, the media management module 111 may perform internally-initiated (e.g., background) tasks such as garbage collections and wear leveling. Both of these may involve occasionally moving blocks of data (e.g., pages) from one physical address to another, and then changing the logical-to-physical mapping to reflect the new location. In this example, the mapping is managed by a LBA lookup interface 112 coupled to the controller 108. The LBA lookup interface 112 may include any combination of hardware and firmware.

The LBA lookup interface 112 receives lookup requests from the controller 108, the requests at least including a logical block address. In response, the LBA lookup interface 112 returns a response that includes a physical address corresponding to the logical block address in the request. The LBA lookup interface 112 accesses a forward table 114 that is located at least in part in a volatile memory 116 (e.g., DRAM). The entries of the forward table 114 are packed into region of the volatile memory 116 so that there need not be any wasted bits. The entries of the forward table 114 may be read and written as shown in FIGS. 2-6.

Figure 2:
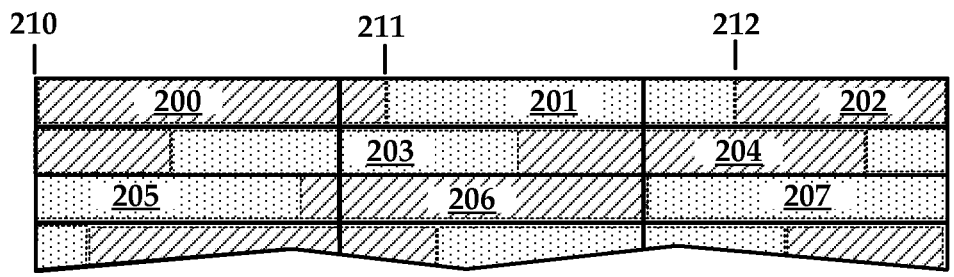
FIG. 2 is a block diagram block diagram showing forward lookup entries packed into a segment of memory according to an example embodiment.

In FIG. 2, a block diagram illustrates how forward lookup entries are packed into a segment of memory according to an example embodiment. In the diagram, the bold outlined rectangles represent individually addressable words in random access memory. While the words are shown in a 2-D array, the addresses of the words are contiguous starting at the top left and going row to row. The shaded regions represent lookup table entries 200-207 packed into the words. In this example, the entries 200-207 are larger than the word sizes, however the concepts describe herein apply equally to configurations where lookup table entries are smaller than the word sizes.

As indicated by bit addresses 210, 211, entry 200 starts on a word boundary but does not end on a word boundary. As indicated by bit addresses 211, 212, entry 201 neither starts nor ends on a word boundary. In cases where the entry sizes are a fixed value and either larger than or smaller than the word sizes, an entry will either have a beginning bit address or ending bit address that does not end on a word boundary. Some padding may be used for purposes of efficiency. For example, it may be desirable to have the first entry in a page of RAM start at the beginning of the first word of the page, and so the last word portion of the preceding page may be unused if it cannot hold a full entry.

Figure 3:
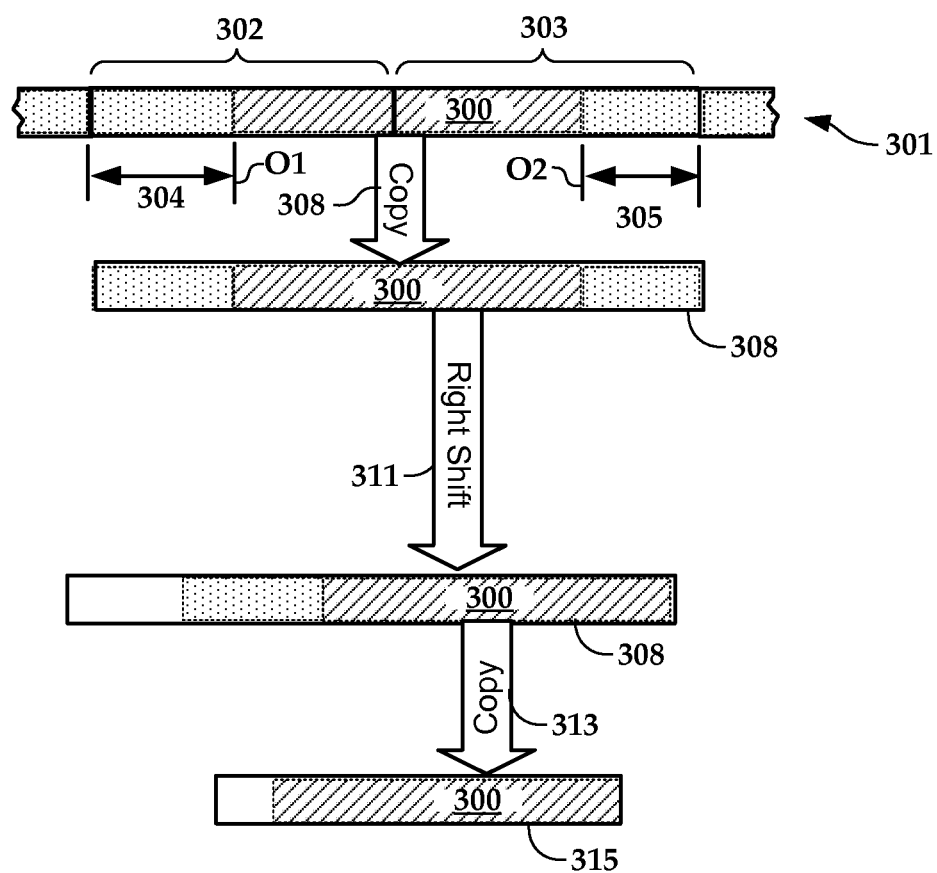
FIG. 3 is a block diagram illustrating reading of an entry from a forward lookup table according to an example embodiment.

In FIG. 3, a block diagram illustrates reading of an entry 300 from a forward lookup table according to an example embodiment. In this example the entry 300 is stored in two words 302, 303 in memory 301, although the concepts described herein may be applicable to entries that fit in more or fewer words. Left offset 304 represents a difference between the starting bit address of word 302 and the starting bit address of the entry 300. Similarly, right offset 305 represents a difference between the ending bit address of word 303 and the ending bit address of the entry 300. It will be understood that the memory controller may not provide bit-wise addressing, and so the bit addresses may be locally defined, e.g., a value between 0 at the start of the word and $n-1$ for an n-bit word. The offsets 304, 305 can be defined using these local bit addresses.

In response to a lookup request, a calculation is performed that determines the starting address of the word 302, the starting bit address of the forward table entry 300, and the number of words that store the complete entry 300 (two in this example). These values are calculated based on the LBA and the bit size of the entry 300, and may be done using integer arithmetic.

For example, assume the words 302, 303 are n-bits, the entry 300 is m-bits, and the table is stored beginning at a starting word address A0 in memory. In such a case, the word address A in RAM where an entry with logical address LBA is stored is found by the integer calculation $A=A0+m*LBA/n$. So, if $m=33$, $n=32$, and $LBA=10$, $A=A0+33*10/32=A0+10$. The left offset O1 (corresponding to beginning offset 304) is determined by the integer calculation $O1=m*LBA \% n$, where % is the remainder or modulus operator. Using the same example as above where $LBA=10$, $O1=330\%32=10$, which is the $11^{th}$ bit in the word starting at address $A=A0+10$. If the right offset O2 is desired, it can be obtained via O2=m*(LBA+1) % n, which is the starting address of the next entry. So for the example where LBA=10, O2=33*11%32=11. Note that the bit address of the last bit of entry 300 (expressed as a relative address of the last word 303) is O2-1.

Based on the starting address A, the needed number of words are copied 306 into a register 308. The number of words N used to store a single entry can be determined by the integer operation N=m/n+1, m>n. So using m=33 and n=32, N=2 and two words are needed to store each entry, similar to the illustrated example. If m<n, the entry may be contained in one or two words. For example if a 31-bit entry is held in 32-bit words, the entry is stored in one word so long as the starting bit address is 0 or 1, and will overflow to the next word for higher starting bit addresses. As such, N=2 may be used for m<n. The register 308 is made large enough to hold N*n bits, or 64-bits using the values of N=2 and n=32 in the above example. The register 308 may be a memory location where all subsequent operations are performed, or the data may be moved into other registers for subsequent processing.

In order to properly align the entry 300 in the register 308, the data of entry 300 may be right-shifted 311. This allows a subsequent copy operation 313 to copy the lowest m-bits to buffer 315. The contents of buffer 315 can be sent as a return to the caller. The buffer contains m-bits of the entry 300, and the entry includes at least a physical address corresponding to the logical address that initiation the operation. In other arrangements, instead of right-shifting 311 the contents of the register 308, m-bits starting at bit address O1 of the register 308 can be copied to an offset within buffer 315 to avoid the right-shift operation 311.

In this example, the buffer 315 has a greater bit length (p) than the entries 300, but less than that of the register 308, e.g., m<p<N*n. This may be due to, e.g., the entries having bit length that is not a power of two, and the available processing devices (and input-output paths) using word sizes that are powers of two in width. In some cases, the buffer 315 may be the same size as the register 308, in which case the contents of the register 308 can be directly copied to the buffer 315.

It will be understood that the operation shown in FIG. 3 can be extended to retrieving more than one lookup table entry based on a request that defines a range of logical addresses. The range of logical addresses may be defined, for example, by a starting logical block address and a number of addresses in the range. This generally involves reading a contiguous range of the random access memory that is not aligned with word boundaries of memory. The contiguous range includes a plurality of physical addresses that are mapped in order to the range of logical addresses. This type of operation may occur when reading large blocks of contiguous user data from the non-volatile memory. Fewer accesses to the forward table are required if the forward table controller logic is aware of the full extent of the request. Generally, the controller logic can use multiple or larger buffers/registers to ensure that multiple memory accesses of the same words from the memory 301 are not required.

In the illustrated example, this may be implemented by having a second register (not shown) similar to register 308. At the same time word 303 is copied into the right half of register 308, it can be copied into the left half of the second register. The word of memory 301 to the right of word 303 can be copied into the right half of the second register during the same operation or a subsequent operation. This ensures the data in the right offset region 305 does not need to be read in twice. In another embodiment, the right shift operation 311 may cause the bits in right offset 305 to be copied to the appropriate location in a second buffer (not shown) instead of just discarded. The right offset bits 305 are the most significant bits of the next table entry. In such a case, the single word to the right of word 303 can be read in and moved to the second buffer to complete this next table entry.

Figure 4:
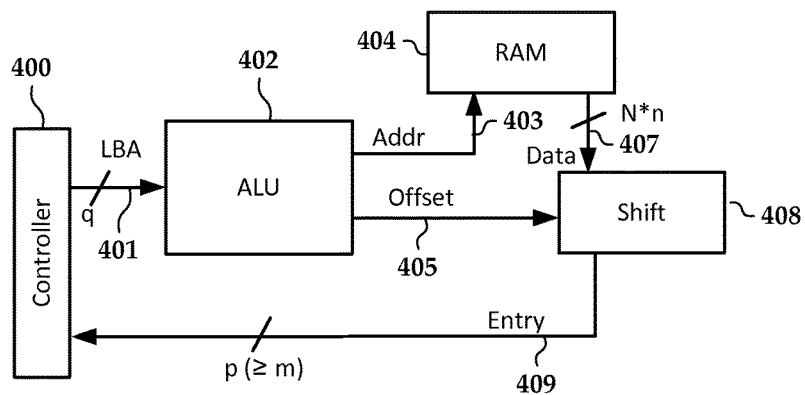
FIG. 4 is a logic diagram illustrating a circuit for reading forward table entries according to an example embodiment.

In reference now to FIG. 4, a logic diagram illustrates a circuit for reading forward table entries according to an example embodiment. A controller 400 inputs q-bits of an LBA 401 to an arithmetic logic unit (ALU) 402. The ALU outputs two values, an address 403 and a bit offset 405. The bit offset 405 may be either a left or right offset as described above. The address 403 is used to fetch data 407 from memory 406 (e.g., RAM), the data 407 being placed in a shift register 408. The bit-width of the data 407 is the word size n times the number of words N used to store a physical address in the memory 404. The offset 405 is used by the shift register 408 to align the m-bits of the entry within the data 407 to either the left or the right of the register 408. The shift register 408 returns the m-bits of entry 409 to the controller 400, and may do so using p≥m bits, e.g., to correspond to a standard bus size of the controller architecture. The entry 409 includes the physical address corresponding to the LBA 401, and may contain additional bits stored with the physical address.

Figure 5:
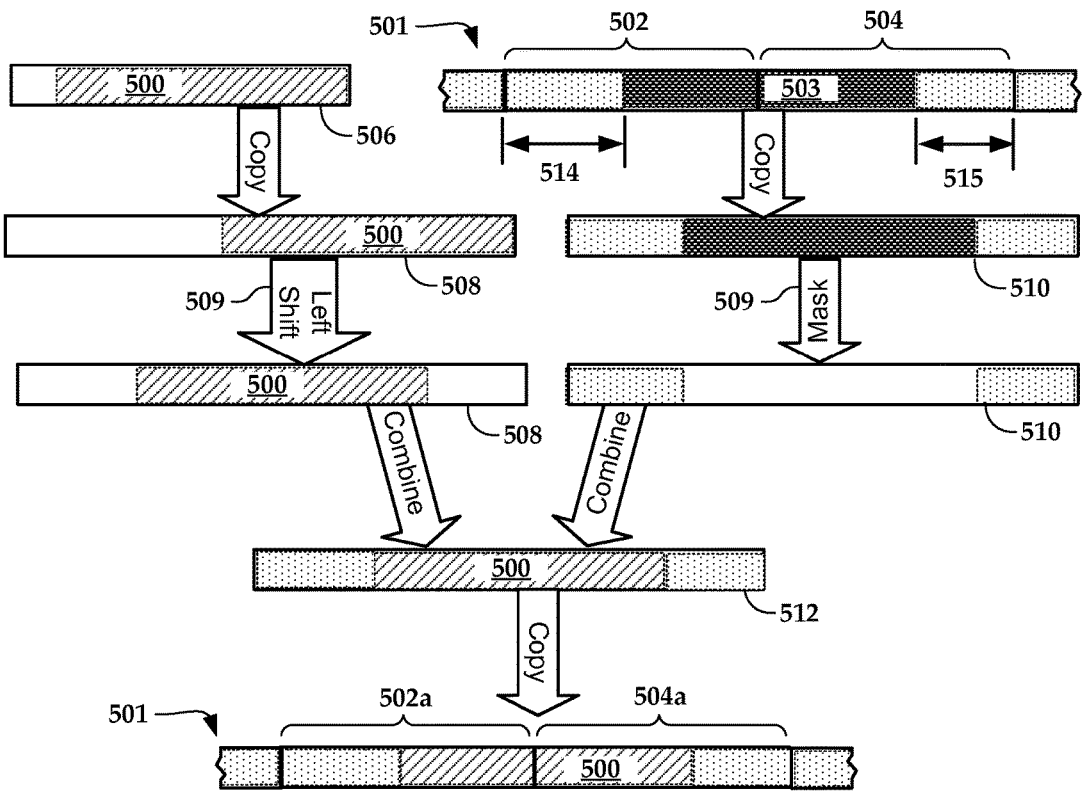
FIG. 5 is a block diagram illustrating illustrates writing or updating of a new entry into a forward lookup table according to an example embodiment.

In FIG. 5, a block diagram illustrates writing or updating of a new entry 500 into a forward lookup table according to an example embodiment. This may occur in response to a host request to update stored data, the stored data referenced by a logical block address. In other cases, the forward table entry 500 may be written/updated in response to an internally-initiated action that results in changes to logical-to-physical mapping, such as garbage collection.

Similar to the previous example, the entry 500 will be stored in memory 501, replacing data block 503 shown in words 502, 504. The data block 503 may store a previous entry, or may be empty. As before, the example may be applicable to entries that fit into more or fewer words. Left offset 514 represents a difference between the starting bit address of data block 503 and the starting bit address of the word 502. Right offset 515 represents a difference between the ending bit address of word 504 and the ending bit address of the data block 503. The location of the words 502, 504 in memory 501, as well as the offsets 514, 515, can be determined based on a logical address associated with the entry 500. Generally, the controller may assume that the data in the left and right offsets 514, 515 belongs to other lookup table entries, and will be preserved when writing/updating the new entry 500.

As before, the entry 500 is m-bits wide, the words 502, 504 are n-bits wide, and a buffer 506 from which the entry 500 is received is p-bits wide. The entry is copied to a first register 508 that is N*n bits wide, 2n in this example. Based on the value of the offset 504, the entry is left shifted 509 in the first register 508. The data from words 502, 504 are copied to a second register 510, and then masked 509 to remove any data in the block 503. This masking operation 509 may include performing a bitwise logical AND with a binary value that is based on the left offset 514 and the length of the block 503. For example, to mask a 4-bit value from an 8-bit register storing X with an offset of two bits, a resulting value Y would be Y=X & 11000011.

The respective shifted and masked values of registers 508, 510 are then combined into a third register 512. Assuming the bits surrounding the entry 500 in register 508 are zero and the masked middle region bits in register 510 are zero, then the combination may be performed using a bitwise logical OR. The results in register 512 can then be copied 514 back into memory 501 as words 502a, 504a. It will be understood that alternate shifting may be used to position the entry 500 into register 508, and alternate logical operations may be used to perform the masking and combining as described above.

It will be understood that the operation in FIG. 5 can be extended to update a contiguous range of table entries that correspond to a contiguous range of logical addresses. This generally involves writing a contiguous range of the random access memory that is not aligned with word boundaries of the memory. The contiguous range includes a plurality of physical addresses that are mapped in order to the range of logical addresses. This type of operation may occur when writing large blocks of contiguous user data to the non-volatile memory. This may be achieved, for example, by placing leading bits of the next entry (not shown) to the right of entry 500 in the third register 512 instead of combining the right half of second register 510 with the entry 500 in third register 312. If such a contiguous update involves replacing all the bits in the two or more words 502, 504, then there will be no need to read or mask the existing data as shown being performed with register 510.

Figure 6:
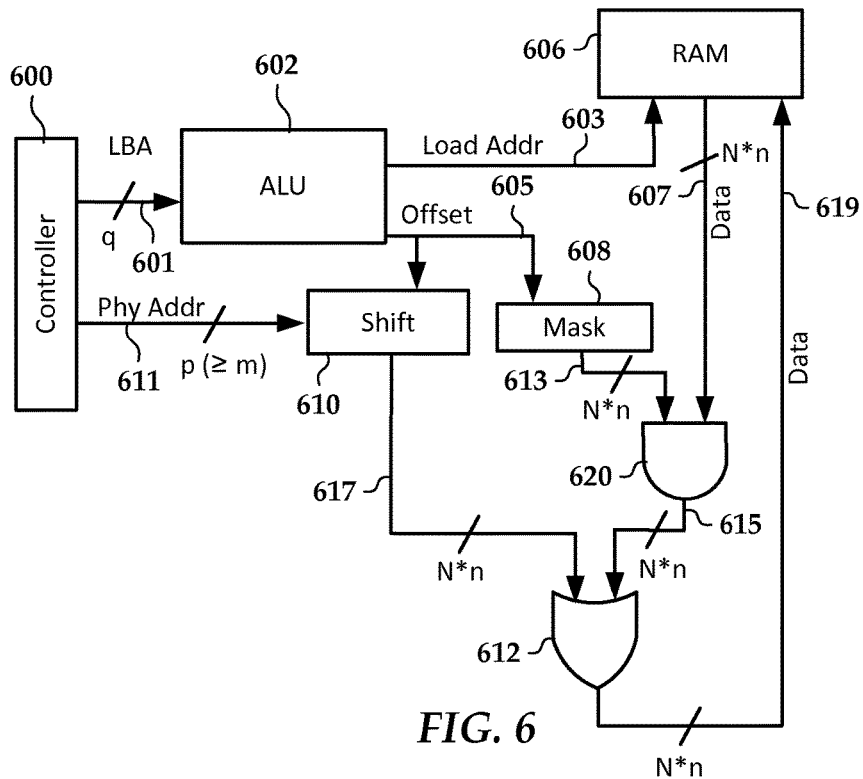
FIG. 6 is a logic diagram illustrating a circuit for writing/updating forward table entries according to an example embodiment.

In FIG. 6, a logic diagram illustrates a circuit for writing/updating forward table entries according to an example embodiment. A controller 600 inputs q-bits of an LBA 601 to an ALU 602. The ALU outputs two values, an address 603 and a bit offset 605. The bit offset 605 may be either a left or right offset as described above. The address 603 is used to fetch data 607 from memory 606 (e.g., RAM), the data 607 being input to an AND gate 620. A masking register 608 uses the offset 605 and the size of the entry (m) to create a mask value 613 that is combined with the data 607 in the AND gate 620 to produce a masked result 615. The masked result 615 contains all zeros at a region where the new entry 611 will be inserted, and other data to the left and/or the right of the region are preserved.

The new entry 611 is provided by the controller 600 along with the LBA 601 and will contain at least a physical address associated with the LBA 601. The entry 611 is placed in a N*n-bit shift register 610, where it is shifted by an amount determined from the offset 605. The resulting shifted value 617 of the shift register 610 is combined with the masked value 615 via an OR gate 612. The data 619 resulting from the OR operation includes an updated entry with N words that are written back to the forward table in memory 606.

Figure 7:
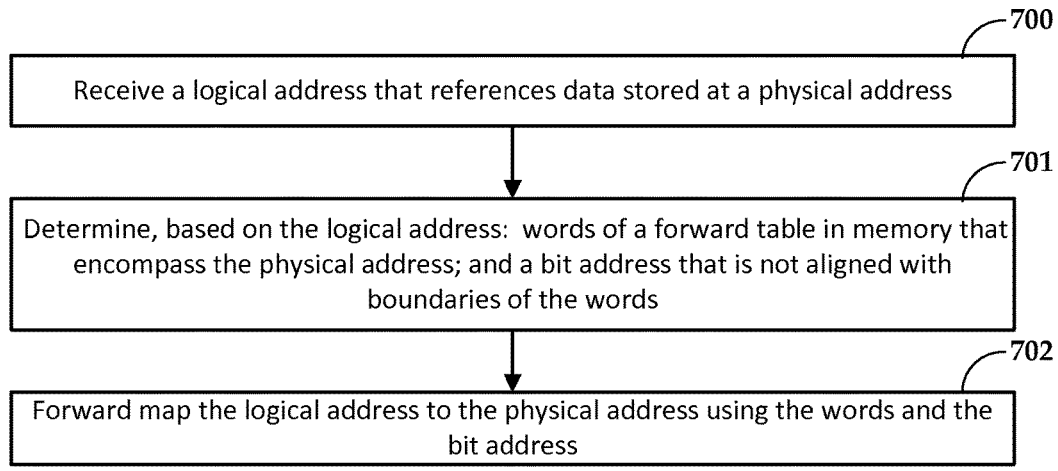
FIGS. 7-9 are flowcharts of methods according to example embodiments.

In reference now to FIG. 7, a flowchart illustrates a method according to an example embodiment. The method involves receiving 700 a logical address that references data stored at a physical address of a non-volatile memory. From the logical address, the following is determined 701: one or more words of a forward table in random access memory, the one or more words encompassing the physical address (e.g., an entry that contains the physical address); and a bit address within the one or more words that is not aligned with boundaries of the one or more words. The bit address may be a starting or ending address for the entry/physical address. Thereafter, forward mapping 702 of the logical address to the physical address utilizes the one or more words and the bit address. The forward mapping may involve reading physical addresses from the forward table and/or writing physical addresses to the forward table.

Figure 8:
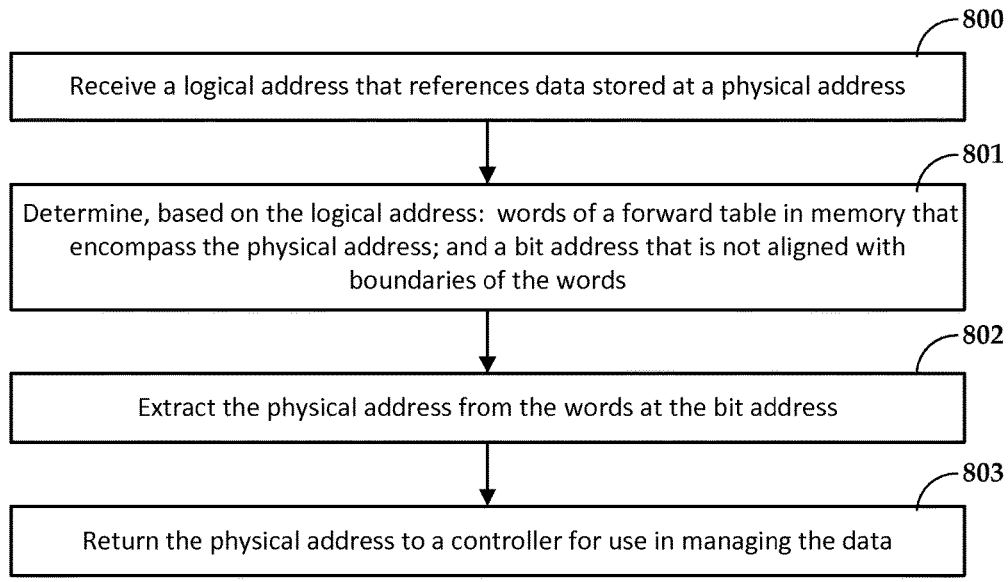

In FIG. 8, a flowchart illustrates a method according to another example embodiment. The method involves receiving 800 a logical address that references data stored at a physical address of a non-volatile memory. From the logical address, one or more words of a forward table and a bit address within the one or more words are determined 801. The physical address is extracted 802 from the one or more words, and the physical address is returned 803 to a controller for use in managing data.

Figure 9:
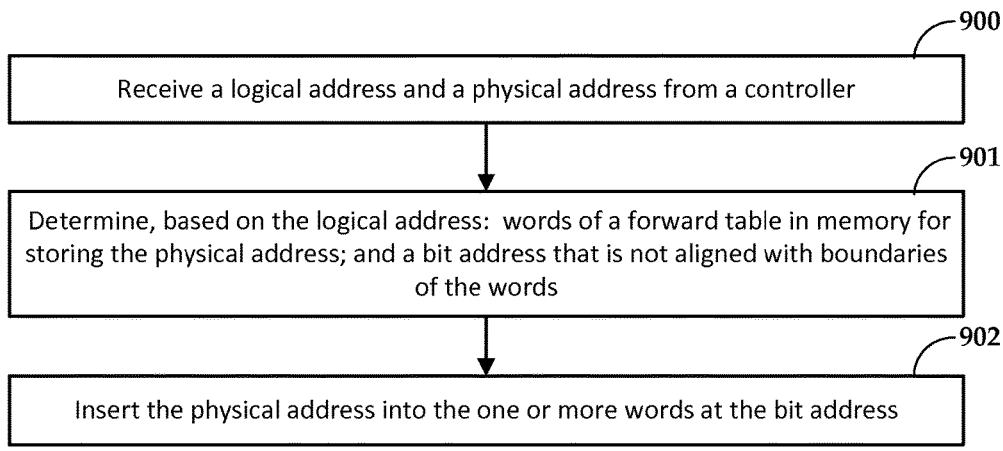

In FIG. 9, a flowchart illustrates a method according to another example embodiment. The method involves receiving 900 a logical address that references data stored at a physical address of a non-volatile memory. From the logical address, one or more words of a forward table and a bit address within the one or more words are determined 901 for storing the physical address. The physical address is inserted 902 into the one or more words at the bit address.

The embodiments shown and described above may be used for creating a forward map of logical-to-physical addresses. These concepts may be used for other purposes, such as reverse mapping. While the table entries shown were of a fixed size, e.g., m-bits, the concepts may be used for entries of different sizes. So long as a pattern can be discerned based on the index (e.g., the logical block address), the logic can be adapted to account for some entries having larger or smaller values without wasting any bits of storage.

The various embodiments described above may be implemented using circuitry and/or software modules that interact to provide particular results. One of skill in the computing arts can readily implement such described functionality, either at a modular level or as a whole, using knowledge generally known in the art. The structures and procedures shown above are only a representative example of embodiments that can be used to facilitate optimizing reference voltages for reading and programming of memory cells.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A method comprising:

receiving a logical block address that references data stored at a physical block address of a non-volatile memory;

determining a start address of a forward table in a random access memory, the forward table comprising contiguous words stored in the random access memory, the contiguous words storing physical block address entries that are each associated with a corresponding logical block address and that are larger than a word size of the contiguous words, the physical block address entries arranged in order of the associated logical block addresses;

determining from the logical block address: an offset within the forward table in random access memory corresponding to a start address of two or more words that store a physical block address entry corresponding to the physical block address; and a bit address within the two or more words that is not aligned with boundaries of the two or more words, the bit address comprising either a beginning or an ending of the physical block address entry within the two or more words; and forward mapping the logical block address to the physical block address utilizing the physical block address entry stored in the two or more words at the bit address.

2. The method of claim 1, further comprising:
extracting the physical block address entry from the two or more words at the bit address; and
returning the physical block address entry to a controller for use in managing the data at the physical block address.

3. The method of claim 2, wherein managing the data comprises reading or writing to the non-volatile memory at the physical block address in response to a host request, the host request including the logical block address.

4. The method of claim 2, wherein extracting the physical block address entry from the two or more words comprises:
copying the two or more words into a register; and
shifting the register by the bit address.

5. The method of claim 1, further comprising:
receiving the physical block address from a controller;
forming the physical block address entry based on the physical block address; and
inserting the physical block address entry into the two or more words offset by the bit address.

6. The method of claim 5, wherein the physical block address is received from the controller in response to an internally initiated task that changes a logical-to-physical mapping of the forward table.

7. The method of claim 5, wherein inserting the physical block address entry into the two or more words comprises:
copying the physical block address entry into a register; and
shifting the register by the bit address;
combining the register with other data stored within the two or more words.

8. The method of claim 1, wherein at least one of a beginning bit and an ending bit of the physical block address entry are not aligned with word boundaries of the random access memory, and wherein a previous physical block address entry ends and a subsequent physical block address entry begins at the respective beginning bit and ending bit.

9. An apparatus, comprising:
a lookup interface configured to communicate with a controller and a random access memory that stores a forward table, the forward table comprising contiguous words stored in the random access memory, the contiguous words storing physical block address entries that are each associated with a corresponding logical block address and that are larger than a word size of the contiguous words, the physical block address entries arranged in order of the associated logical block addresses, the lookup interface configured to:
receive from the controller a logical block address that references data stored at a physical block address of a non-volatile memory;
determine from the logical block address: an offset within the forward table corresponding to a start address of two or more words that store the physical block address entry corresponding to the physical block address; and a bit address within the one or more words that is not aligned with boundaries of the two or more words, the bit address comprising either a beginning or an ending of the physical block address entry within the two or more words; and
forward map the logical block address to the physical block address utilizing the physical block address entry stored in the two or more words at the bit address.

10. The apparatus of claim 9, wherein the lookup interface is further configured to:
extract the physical block address from the two or more words using the bit address; and
return the physical block address entry to the controller for use in managing the data at the physical block address.

11. The apparatus of claim 10, wherein managing the data comprises reading or writing to the non-volatile memory at the physical block address in response to a host request, the host request including the logical block address.

12. The apparatus of claim 9, wherein the lookup interface is further configured to:
receive the physical block address from the controller;
form the physical block address entry based on the physical block address; and
insert the physical block address entry into the two or more words at the bit address.

13. The apparatus of claim 12, wherein the lookup interface comprises:
an arithmetic logic unit that receives the logical block address and in response determines the start address of the two or more words of the forward table and a bit offset within the one or more words based on the logical block address;
an AND gate that provides a masked result based on the two or more words of the forward table, the masked result comprising zeros in a region corresponding to the offset where the physical block address will be inserted;
a shift register that provides a shifted value comprising the physical block address shifted by the bit offset; and
an OR gate that combines the masked result and the shifted value to produce the physical block address entry, the physical block address entry written to the forward table.

14. The apparatus of claim 13, wherein the lookup interface further comprises a masking register that generates a mask based on the bit offset, the mask input to the AND gate.

15. The apparatus of claim 9, wherein the random access memory comprises 32-bit word boundaries, and wherein the physical block address is larger than 32-bits and less than 64-bits.

16. The apparatus of claim 9, wherein the lookup interface comprises:
an arithmetic logic unit that receives the logical block address and in response determines the starting address of the two or more words of the forward table based on the logical block address and a bit offset within the two or more words based on the logical block address; and
a shift register that shifts the two or more words of the forward table by the bit offset.

17. The apparatus of claim 9, wherein at least one of a beginning bit and an ending bit of the physical block address entry are not aligned with word boundaries of the random access memory, and wherein a previous physical block address entry ends and a subsequent physical block address entry begins at the respective beginning bit and ending bit.

18. A data storage device, comprising:
a controller;
a host interface coupled to the controller, the host interface receiving host requests using logical block addresses;
a random access memory that stores a forward table, the forward table comprising contiguous physical block address entries each associated with the logical block addresses, the physical block address entries arranged in order of the associated logical block addresses and each having a bit length that is greater that a word size of the random access memory but less than twice the word size; and a lookup interface coupled to the controller and the random access memory, the lookup interface configured to access the entries and read or write at least the physical block addresses entries each stored in two words in the forward table in response to receiving the associated logical block addresses, the lookup interface determining, based on the logical block address, at least one of a beginning bit and an ending bit of the physical block address entries that is not aligned with boundaries of the two words, and wherein a previous physical block address entry ends and a subsequent physical block address entry begins at the respective beginning bit and ending bit.

19. The data storage device of claim 18, wherein the lookup interface is configured to read or write the physical block address entries to the forward table in response to a host request for reading or writing data to a non-volatile memory at the physical block addresses in response to the host requests.

20. The data storage device of claim 18, wherein the word size of the random access memory is 32-bits.

* * * * *